United States Patent [19]

Shimizu et al.

[11] Patent Number: 5,709,022

[45] Date of Patent: Jan. 20, 1998

[54] METHOD AND APPARATUS FOR ASSEMBLING PHOTOGRAPHIC FILM CASSETTE

[75] Inventors: Makoto Shimizu; Takayuki Kambara, both of Kanagawa, Japan

[73] Assignee: Fuji Photo Film Co., Ltd., Kanagawa, Japan

[21] Appl. No.: 440,933

[22] Filed: May 15, 1995

[30] Foreign Application Priority Data

May 17, 1994 [JP] Japan .................. 6-102896

[51] Int. Cl.⁶ .................. B23P 19/04; B23P 21/00; B23Q 7/18
[52] U.S. Cl. .................. 29/434; 29/469; 29/789; 29/797; 29/806; 53/118; 242/348.1; 242/548.3
[58] Field of Search .................. 29/434, 450, 469, 29/712, 789, 792, 797, 806, 724; 53/116, 117, 118; 242/329, 348.1, 348.3, 358.1, 548.3

[56] References Cited

U.S. PATENT DOCUMENTS

| 4,100,667 | 7/1978 | Napor et al. ............... 29/792 X |
| 4,115,913 | 9/1978 | Moriya et al. ............... 53/118 X |
| 4,205,436 | 6/1980 | Klatz et al. ............... 29/806 X |
| 4,228,579 | 10/1980 | Dunkel et al. ............... 29/806 X |
| 4,564,999 | 1/1986 | Uchiyama et al. ............... 242/548.3 X |
| 4,656,737 | 4/1987 | Shimizu et al. ............... 29/806 |
| 4,834,306 | 5/1989 | Robertson et al. ............... 242/348.3 |
| 4,965,931 | 10/1990 | Suzuki et al. ............... 29/806 X |
| 5,038,464 | 8/1991 | Suzuki et al. ............... 29/806 |
| 5,462,240 | 10/1995 | Enaki et al. ............... 242/348.1 |

FOREIGN PATENT DOCUMENTS

| 0575994 | 12/1993 | European Pat. Off. . |
| 0579228 | 3/1994 | European Pat. Off. . |
| 0584583 | 3/1994 | European Pat. Off. ............... 29/806 |
| 622662 | 11/1994 | European Pat. Off. ............... 29/306 |
| 4115251 | 4/1992 | Japan ............... G03C 3/00 |

*Primary Examiner*—Peter Vo
*Attorney, Agent, or Firm*—Sughrue, Mion, Zinn, Macpeak & Seas, PLLC

[57] ABSTRACT

An apparatus for assembling a photographic film cassette whose cassette shell is constituted of a pair of shell halves, and contains a spool having a filmstrip wound thereon. A bucket conveyer successively conveys a plurality of buckets through a series of stations. The buckets each has a recess formed to hold a first shell half stationary therein. The first shell half is put in the recess of the bucket in the first station, and a spool is located in the lower shell half to be rotatable therein in the second station. In the next station, the spool is rotated to be set in a predetermined angular position, and the spool is connected to an end of a filmstrip which is fed through a film feed chute. Thereafter, the spool is rotated to wind the filmstrip onto the spool. In the following station, a second shell half is joined to the first shell half to form the cassette shell so as to contain the spool with the filmstrip therein.

8 Claims, 5 Drawing Sheets

METHOD AND APPARATUS FOR ASSEMBLING PHOTOGRAPHIC FILM CASSETTE

BACKGROUND OF THE INVENTION

1. Field of the Invention

The present invention relates to a method for assembling photographic film cassettes, especially for a photographic film cassette whose cassette shell is constituted of a pair of shell halves, and mounts a spool rotatable therein, which is constituted of a spool core and a pair of flanges.

2. Background Art

Photographic film cassettes have been proposed, such as those disclosed in U.S. Pat. No. 4,834,306 or JPA 4-115251, which, unlike conventional film cassettes, has a shell assembled from resin molded parts, and which can be operated to advance a film leader out of the cassette shell by rotating the spool in a direction to unwind the film roll. Since the film leader is non-protruding, i.e. it is located entirely within the cassette shell not only after use but also before use, such leader-advancing type photographic film cassette surely prevents the filmstrip from being fogged, and is easy to load and unload.

To allow a film leading end or film leader to be advanced out of a cassette shell by rotating a spool, an example of leader-advancing type film cassette has a spool Which is constituted of a spool core and a pair of flanges. The flanges are formed separately from the spool core and mounted to the spool core such that the flanges may be freely inclined relative to the spool core within a given range. The cassette shell has ribs or ridges formed on inside of end faces of the cylindrical cassette shell to confine the flanges such that the ridges push the flanges to clamp lateral end faces of a film roll wound on the spool core so as to keep the film roll from unwinding. By virtue of this construction, the film roll may be rotated together with the spool also in the unwinding direction. In accordance with the rotation of the film roll in the unwinding direction, the film leader is guided to a film passage mouth by a guide member and hence to the outside of the cassette shell through the film passage mouth.

U.S. patent Ser. No. 08/080,515 filed on Jun. 24, 1993, now U.S. Pat. No. 5,437,828 (corresponding to JPA 6-11802) discloses a method of manufacturing such leader-advancing type photographic film cassettes, wherein an end of a filmstrip is fastened to a spool having flanges previously mounted thereon, to wind the filmstrip in a roll on the spool, and then the spool with the film roll is mounted in a cassette shell constituted of shell halves. On the other hand, U.S. patent Ser. No. 08/091,627, filed on Jul. 15, 1993, now U.S. Pat. No. 5,426,240 (corresponding to JPA 6-35128) discloses a cassette assembling method wherein a spool is first mounted in a cassette shell, and an end of a filmstrip is inserted through a mouth of the cassette shell, to be secured to the spool, and then the spool is rotated to wind the filmstrip onto the spool.

However, if the film cassette whose spool has inclinable flanges is assembled in accordance with the method as disclosed in U.S. patent Ser. No. 08/080,515, the flanges could clash into the internal ridges of the cassette shell when the spool with the film roll is mounted in the cassette shell. As a result, the ridge or the flange may be damaged, or malfunction of the film cassette may occur. To prevent the collision between the flange and the ridge, it is necessary to use an assembling mechanism with a superior positioning accuracy, which can be complicated, expensive and large in scale.

The method as disclosed in U.S. patent Ser. No. 08/091,627 is unsuitable for those film cassettes whose film passage mouths are provided with plush ribbons or sponges as light-trapping members, because not only resistance against insertion of the film end through the mouths is too large, but also the light-trapping property of the plush ribbons or sponges is lowered by the film end thrusting therethrough.

OBJECT OF THE INVENTION

In view of the foregoing, a primary object of the present invention is to provide a method for assembling photographic film cassettes, which enables a reliable and efficient assembly of the film cassettes without the need for a highly precise positioning of the spool relative to the cassette shell, and without degrading the light-trapping member.

SUMMARY OF THE INVENTION

To achieve the above and other objects, the present invention locates a spool in a first shell segment, such as a lower shell half, fastens an end of a filmstrip to the spool, and rotates the spool to wind the filmstrip onto the spool. Thereafter, remaining shell segments, such as an upper shell half, is joined to the first shell segment to form a cassette shell to contain the spool with the film roll therein.

Since the flanges of the spool having no film wound thereon do not conflict with the internal ridges of the cassette shell when locating the spool in the shell half, the method of the present invention requires less accuracy than that required for locating a spool with a film roll in a shell half.

An apparatus for executing the method of the present invention uses a bucket conveyer which successively conveys a plurality of buckets through a series of stations. The buckets each have a recess formed to hold a lower shell half stationary therein. The lower shell half is put in the recess of the bucket in the first station of the series. In the second station, a spool is located in the lower shell half to be rotatable therein with the rotational axis oriented horizontally. In the third station, the spool is rotated to be set in a predetermined angular position wherein the spool is connected to an end of a filmstrip which is fed through a feeding device. Thereafter, the spool is rotated to wind the filmstrip onto the spool. In the following station, an upper shell half is joined to the lower shell half to form a cassette shell to contain the spool with the filmstrip therein.

BRIEF DESCRIPTION OF THE DRAWINGS

Other objects and advantages of the present invention will become apparent in the following detailed description of the preferred embodiments when read in connection with the accompanying drawings, wherein like reference numerals designates like or corresponding parts throughout the several views, and wherein:

FIG. 1 is an exploded perspective view of an example of photographic film cassettes to be assembled;

FIG. 2 is an explanatory sectional view for illustrating an engagement between a filmstrip and a spool of the film cassette;

FIG. 3 is a schematic view of an assembling apparatus according to a preferred embodiment of the invention;

FIG. 4 is a perspective view of a film winding unit of the assembling apparatus shown in FIG. 3;

FIG. 5 is an explanatory view illustrating the operation of the film winding unit shown in FIG. 4; and

FIG. 6 is an enlarged view, partly in section, of a film feed roller device of the assembling apparatus shown in FIG. 3.

DETAILED DESCRIPTION OF THE PREFERRED EMBODIMENTS

Figure 1:
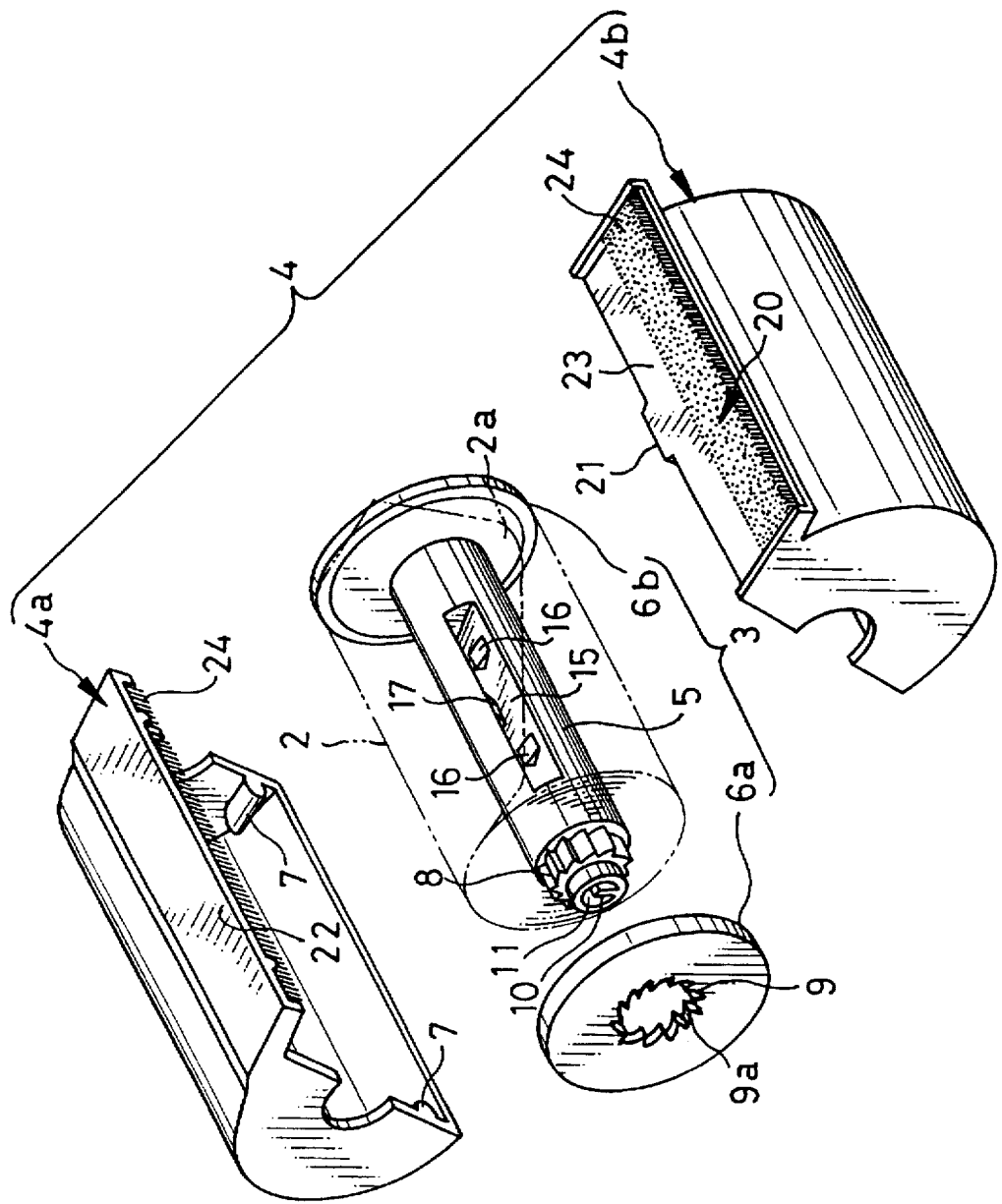

FIG. 1 shows an example of a leader-advancing photographic film cassette wherein a filmstrip 2 is wound on a spool 3 in a roll, and is mounted in a shell 4 in a rotatable manner. The cassette shell 4 is constituted of a pair of shell halves 4a and 4b, each of which is molded from resin. The spool 3 is constituted of a spool core 5 and a pair of flanges 6a and 6b disposed on opposite ends of the spool core 5. The filmstrip 2 is coiled about the spool core 5 between the flanges 6a and 6b. Ridges 7 are formed on lateral inside end surfaces of the shell halves 4a and 4b so as to project inwardly to press the flanges 6a and 6b against lateral end faces of the roll of the filmstrip 2. Since the flanges 6a and 6b have fringes or lips protruding inwardly to cover lateral edges of the outermost convolution of the film roll 2, the film roll 2 is not only confined by the flanges 6a and 6b in the lateral direction, but also kept from radially expending in an unused position wherein the filmstrip 2 is entirely wound in the cassette shell 4. An outermost end or film leader 2a of the filmstrip 2 is tapered to be free from the confinement of the flanges 6a and 6b.

The spool core 5 has engaging teeth 8 formed around opposite end portions thereof, while center holes 9 of the flanges 6a and 6b are provided with teeth 9a. The teeth 8 and 9a are adapted to mesh with each other only when the spool core is rotated in a direction to unwind the filmstrip 2. That is, the flanges 6a and 6b are rotated together with the spool core 5 in the unwinding direction. By virtue of the confinement of the flanges 6a and 6b, the film roll 2 is also rotated with the spool 3 in the unwinding direction. But when the spool core 5 is rotated in a winding direction, the teeth 8 do not engage the teeth 9a so that the spool core 5 rotates freely from the flanges 6a and 6b. Accordingly, the power necessary for winding the filmstrip 2 onto the spool 3 is reduced by comparison.

The spool core 5 has a key 10 formed in either end face thereof. The end faces of the spool core 5 are exposed to the outside of the cassette shell 4 to enable the spool core 5 to be externally rotated by a rotary device, e.g., a spool drive shaft of a camera or a cassette assembling apparatus, which is engaged with the key 10. Also, the key 10 has a notch 11 which serves as a reference for detecting the angular or rotational position of the spool core 5.

Figure 2:
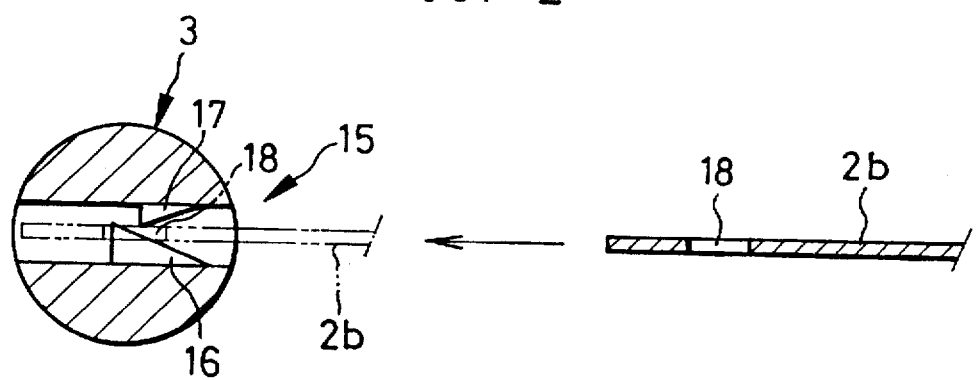

The spool core 5 has an axial slit 15 having a pair of claws 16 and a press member 17 formed on inside surfaces thereof. As shown in FIG. 2, an innermost end or film trailer 2b of the filmstrip 2 has holes 18 formed therethrough, and is inserted in the slit 15 so as to engage the holes 18 with the claws 16. Since the press member 17 is disposed in opposition to and between the claws 16 to press the film trailer 2b toward the claws 16, the filmstrip 2 is securely attached to the spool core 3.

A film passage mouth 20 is defined between port portions 22 and 23 of the shell halves 4a and 4b when the shell halves 4a and 4b are joined to each other. A separating claw 21 is formed inside the port portion 23 of the shell half 4b, hereinafter referred to as the lower shell half 4b, for guiding the film leader 2a away from the spool 3 toward the film passage mouth 20 when the film roll 2 is rotated together with the spool 3 in the unwinding direction. As a result, the film leader 2a is advanced to the outside of the cassette shell 4. Light-trapping ribbons 24 are attached to the inner surfaces of the port portions 22 and 23.

Figure 3:
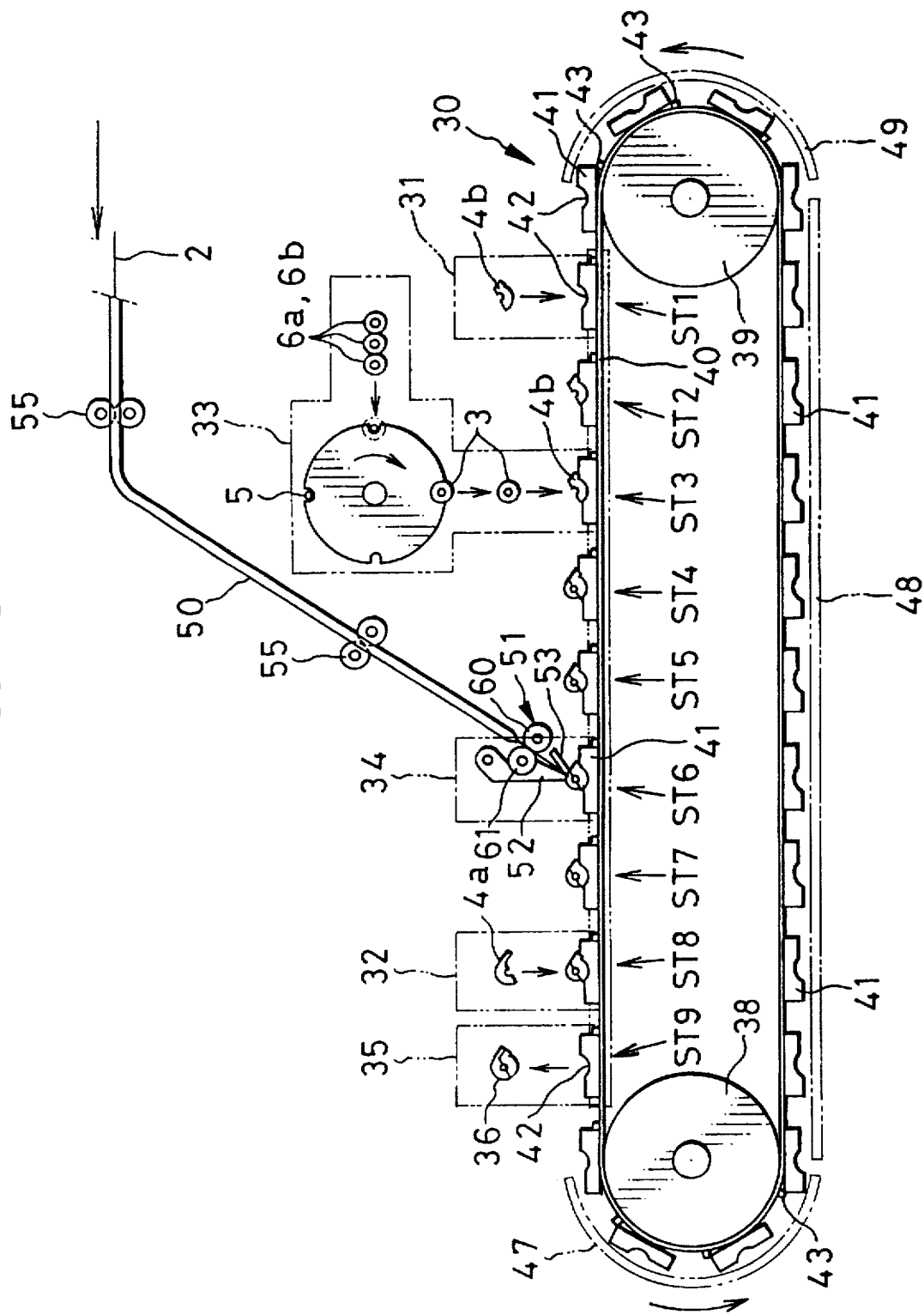

FIG. 3 shows the overall construction of a cassette assembling apparatus according to a preferred embodiment of the invention. The cassette assembling apparatus is constituted of a bucket conveyer 30, pick-and-place units 31 and 32, a spool assembling unit 33, a film winding unit 34 and a transfer unit 35 for transferring completely assembled photographic film cassettes 36 to another process. The bucket conveyer 30 is constituted of pulleys 38 and 39, an endless belt 40 circulating around the pulleys 38 and 39, and a plurality of buckets 41 conveyed on the endless belt 40 at regular intervals. The bucket 41 has a recess 42 which is adapted in shape to the lower shell half 4b for stably receiving the lower shell half 4b therein.

The endless belt 40 has a plurality of bucket spacers 43 mounted on the bearing surface thereof. The bucket spacers 43 are spaced equally in the longitudinal direction of the belt 40 by a distance slightly longer than the length of the bucket 41. The bucket spacers 43 are rectangular ridges projecting from the bearing surface of the belt 40, which confine the buckets 41 at the leading and trailing ends thereof in the conveying direction. Instead of the rectangular ridges, bucket spacers 43 may be formed by pins which are adapted to be loosely engaged in holes which may be formed in the bottom of the buckets.

Figure 4:
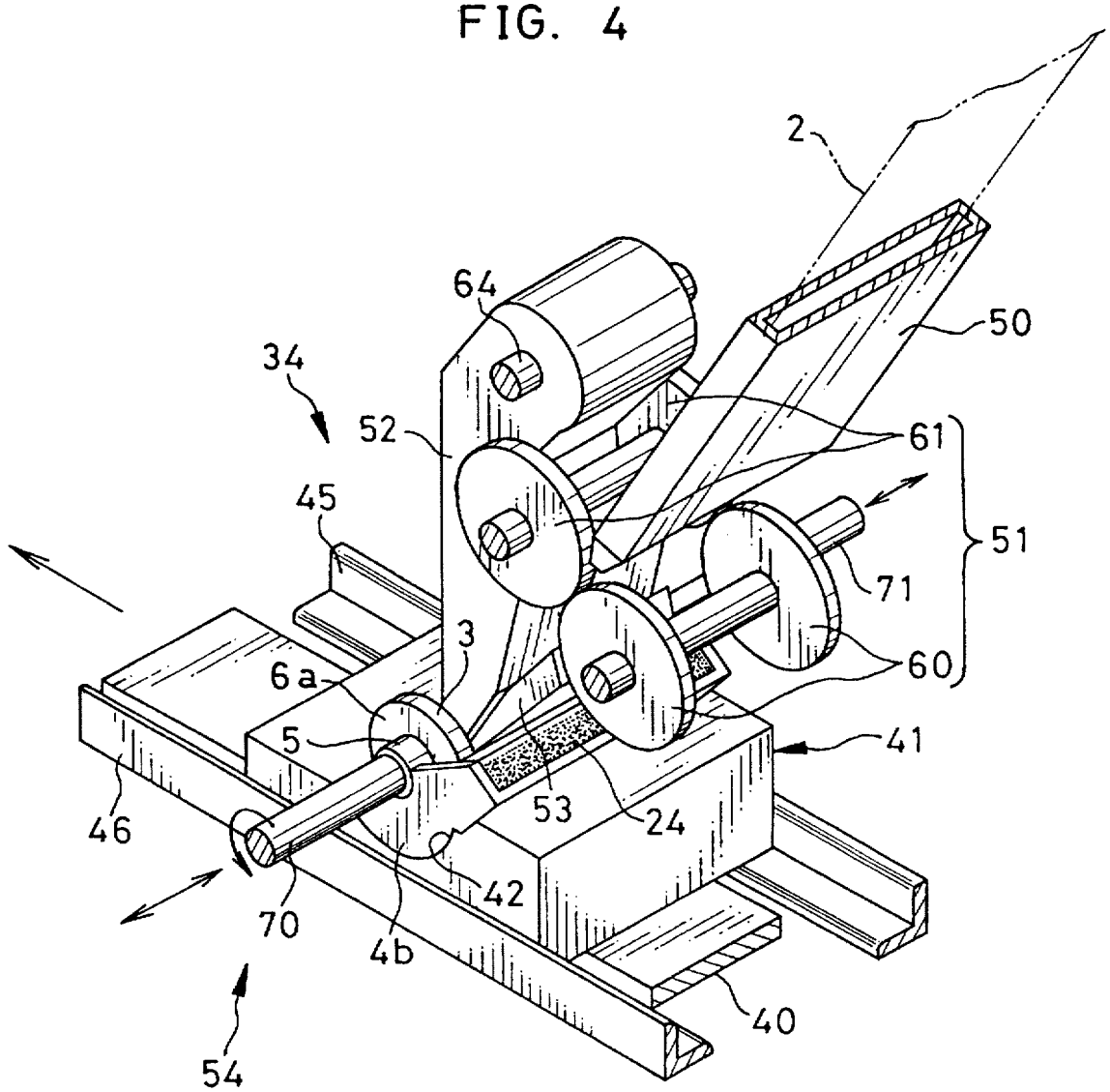

As shown in FIG. 4, a pair of bucket guides 45 and 46 are disposed along lateral sides of the endless belt 40 in an upper horizontal path thereof. The bucket guides 45 and 46 confine the position of the buckets 41 in the lateral direction and also maintain the buckets 41 horizontal. Anti-drop guide members 47, 48 and 49 for preventing the buckets 41 from dropping from the endless belt 40 are disposed along a lower horizontal path as well as turning portions around the pulleys 38 and 39 of the endless belt 40.

The bucket conveyer 30 stepwise rotates the pulleys 38 and 39 to feed and stop the buckets 41 at stations ST1 to ST9 which are spaced equally from each other along the upper horizontal path of the endless belt 40. A not-shown bucket positioning device is disposed in each station for positioning the bucket 41 in the lateral and longitudinal directions thereof. The bucket positioning device may have a conventional construction. The above units 31 to 35 are disposed each in one of these stations ST1 to ST9. The buckets 41 are fed back from the last station ST9 to the first station ST1 through the lower path of the endless belt 40.

The pick-and-place unit 31 is disposed in the first station ST1, to place the lower shell half 4b in the recess 42 of the bucket 41 stopping at this station ST1. For example, the pick-and-place unit 31 has a pair of robot arms, one of which places the lower shell half 4b in the recess 42, while the other arm picks up another lower shell half 4 from a parts feeder, and then the robot arms are rotated through 180° to alternate with each other.

The spool assembling unit 33 is disposed in the third station ST3, which attaches the flanges 6a and 6b to the spool core 5 in a conventional manner, and mounts the consequent spool 3 in the lower shell half 4b held in the recess 42 of the bucket 41.

Figure 5:
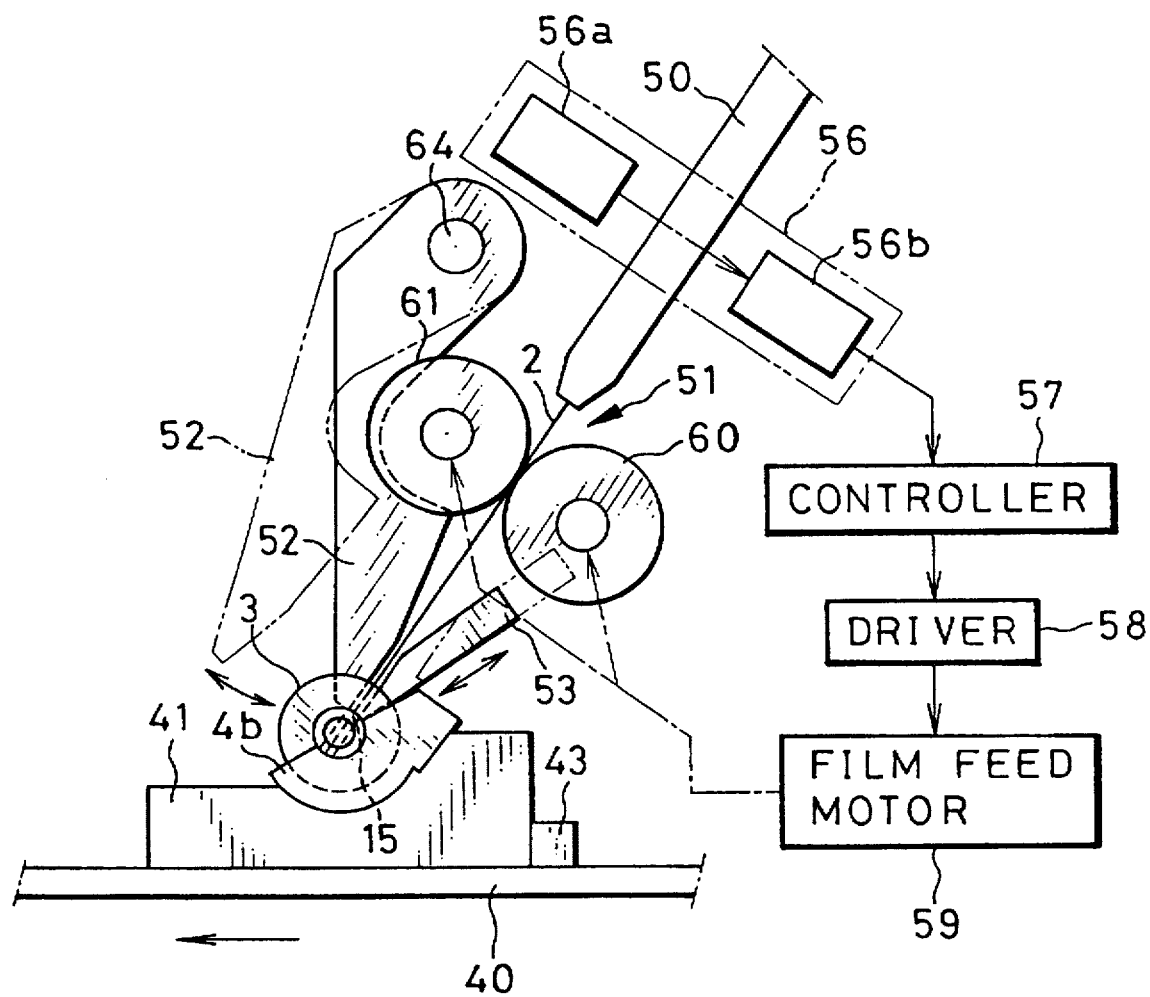

The film winding unit 34 is disposed in the sixth station ST6. As shown in FIGS. 4 and 5, the film winding unit 34 is constituted of a film feed chute or duct 50, an insert roller device 51, a pair of insert guide members 52 and 53, a spool drive device 54, and a film sensor 56. The film feed chute 50 is adapted to feed the filmstrip 2 from a not-shown film supply section to the sixth station ST6. Feed roller devices 55 are disposed in the film feed chute 50 at appropriate intervals to feed the filmstrip 2 through the chute 50, as is shown in FIG. 3. The insert roller device 51 is disposed behind an outlet of the chute 50 in the film feeding direction, so as to feed the filmstrip 2 toward the spool 3 held on the bucket 41 positioned in the sixth station ST6.

Figure 6:
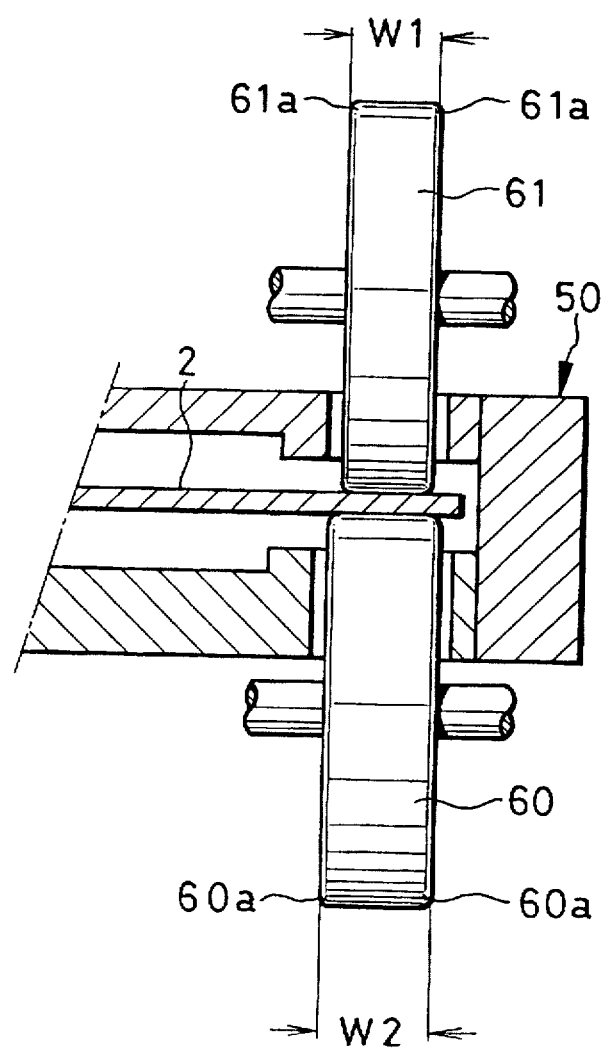

The filmstrip 2 contained in the leader-advancing photographic film cassette 36 is made of a base material having a smaller friction coefficient than that of conventional 35 mm photographic film, for smooth advance of the film leader 2a through the film passage mouth 20. Also, to make the film cassette 36 compact, the filmstrip 2 has smaller thickness and width than the 35 mm photographic film, i.e., the width of the filmstrip 2 is about 24 mm. For reliable feeding of such filmstrip 2, the feed roller devices 55 and the insert roller device 51 must have a nipping pressure many times as large as conventional. According to a preferred embodiment, the feed roller devices 55 and the insert roller device 51 are each constituted of a pair of co-rotating metal rollers 60 and a pair of co-rotating rubber covered rollers 61. The filmstrip 2 is nipped between the metal roller 60 and the rubber covered roller 61 at either lateral side thereof, as shown for example in FIG. 6.

The rollers 60 and 61 have rims rounded with a radius of 0.2 mm or more so as to uniformly nip the filmstrip 2 to prevent the filmstrip 2 from being distorted or crooked. The rubber covered roller 61 has a peripheral surface whose width W1 is slightly less than a width W2 of a smooth peripheral surface of the metal roller 60. The rubber covered roller 61 is positioned relative to the metal roller 60 such that the contact surface of the rubber covered roller 61 on the filmstrip 2 may not extend beyond that of the metal roller 60.

Referring again to FIG. 5, the film sensor 56 is disposed proximate the outlet of the chute 50 to detect the film trailer 2b of the filmstrip 2 fed through the chute 50. The film sensor 56 is, for example, a photo sensor having a photo emission element 56a and a photo reception element 56b. The film sensor 56 outputs a detection signal to a controller 57. In response to the detection signal, the controller 57 controls a driver 57 to drive a film feed motor 59 which is coupled to the roller devices 51 and 55, so as to feed the film 2 by a constant amount from the point when the film sensor 56 detects the film trailer 2b. In this way, the film trailer 2b is inserted and positioned in the slit 15 of the spool 3 to make an engagement between the holes 18 and the claws 16. Since the press member 17 secures the engagement, the filmstrip 2 will not easily slip off the spool 3.

The insert guide members 52 and 53 are disposed on opposite sides of the film feed path from the insert roller device 51 toward the spool 3 on the bucket 41. The insert guide members 52 and 53 are movable between a guide position, as shown by solid lines in FIG. 5, for guiding the film trailer 2b into the slit 15 of the spool 3, and a rest position as shown by phantom lines in FIG. 5. The insert guide member 52 is mounted pivotal about an axle 64 which is disposed in an upper portion thereof. The insert guide member 53 is mounted slidable in a direction parallel or diagonal to the film feed path. In the guide position, lower tips of the insert guide members 52 and 53 are placed proximate the slit 15 of the spool 3 which is previously positioned in a predetermined angular position. When the film trailer 2b is secured to the spool 3, the insert guide members 52 and 53 are retracted from the spool 3 to the rest position so as not to hinder the filmstrip 2 from being wound on the spool 3 or the bucket 41 from being conveyed to the next station. It is possible to retract the guide members 52 and 53 from the lower shell half 4b in other ways.

As shown in FIG. 4, a drive shaft 70 and a positioning shaft 71 of the spool drive device 54 are disposed on opposite lateral sides of the endless belt 40 so as to be coaxial with the spool 3 positioned in the sixth station ST6. These shafts 70 and 71 are axially movable to be coupled to the spool core 5 at its end faces, and are rotatable to rotate the spool 3 in the lower shell 4b on the bucket 41. First, the spool 3 is rotated to position the slit 15 in the predetermined angular position opposing to the lower tips of the insert guide members 52 and 53 in the guide position. After the film trailer 2b is inserted in the slit 15 to bring the holes 18 into engagement with the claws 16, the insert guide members 52 and 53 are reset to the rest position, and then the drive shaft 70 rotates the spool 3 in the winding direction to wind the filmstrip 2 onto the spool 3.

As shown in FIG. 3, the pick-and-place unit 32 is disposed in the eighth station ST8 to mount the upper shell half 4a to the lower shell half 4b to light-tightly contain the spool 3 with the roll of filmstrip 2 in the cassette shell 4. The pick-and-place unit 32 may have the same construction as the pick-and-place unit 31. It is to be noted that the light-trapping ribbons 24 are previously attached to the shell halves 4a and 4b before the assembling. In the last or ninth station ST9, the transfer unit 35 removes the consequent photographic film cassette 36 from the recess 42 of the bucket 41 to transfer the cassette 36 to the next process.

The above-described assembling apparatus operates as follows:

The buckets 41 are serially fed to the stations ST1 to ST9 in an intermittent fashion. In the first station ST1, the pick-and-place unit 31 puts the lower shell half 4b in the recess 42 of the bucket 41. Next, the spool assembling unit 33 places the spool 3 having been assembled therein into the lower shell half 4b on the bucket 41 positioned in the third station ST3. When the bucket 41 bearing the lower shell half 4b with the spool 3 is positioned in the sixth station ST6, the insert guide members 52 and 53 are set in the guide position, and then the drive shaft 70 and the positioning shaft 71 move toward each other to hold the spool 3 at its end faces. Thereafter, the spool 3 is rotated in the winding direction to direct the slit 15 to the lower tips of the insert guide members 52 and 53. Then, the insert guide roller device 51 is rotated to insert the film trailer 2b into the slit 15 to make the engagement between the holes 18 and the claws 16. Thereafter, the insert guide members 52 and 53 are reset to the rest position, and the drive shaft 70 is rotated to wind the filmstrip 2 onto the spool 3.

In the eighth station ST8, the upper shell half 4a is joined to the lower shell half 4b, in which the film strip 2 has been wound on the spool 3, to complete assembly of the photographic film cassette 36. The photographic film cassette 36 is transferred by the transfer unit 35 to the next process.

Although the present invention has been described in detail with respect to a preferred embodiment for manufacturing photographic film cassettes as shown in the drawings, it is possible to apply the invention to the manufacturing of other types of photographic film cassettes such as disclosed in U.S. patent Ser. No. 08/091,627 wherein a pair of flexible resin disc having lips for radially constraining the film roll are fitted to a spool core having integrally formed flanges. The buckets 41 may be conveyed on a turntable conveyer circulating around a vertical axis or vertical axes while maintaining a horizontal bearing surface.

Although the above-described embodiment relates to the essential or fundamental construction and operation of the invention, it is, of course, possible to assemble other elements such as a bar code disc, a mouth shutter or the like into the film cassette in the other stations of the assembling apparatus. It is also possible to apply the present invention to assembling a film cassette whose shell is constituted of more than two segments sectioned through a rotational axis of a spool mounted therein. Although the spool assembling unit 33 assembles the flanges 6a and 6b and the spool core 5 into the spool 3, and then mounts the spool 3 in the lower shell half 4b, it is possible to previously assemble the spools 3 in another process, and transfer the spools 3 to the third station ST3 of the bucket conveyer 30, to mount the spool 3 in the lower shell half 4b by means of a pick-and-place unit.

Thus, the present invention is not to be limited to the above-described embodiment, but on the contrary, various modifications may be provided without departing from the scope of the invention as defined by the appended claims.

What is claimed is:

1. A method of assembling a photographic film cassette having a cassette shell, a spool mounted in said cassette shell to be rotatable about an axis, and a photographic filmstrip coiled about said spool, said cassette shell comprising at least first and second shell segments sectioned through said rotational axis of said spool, said assembling method comprising the steps of:

A. locating said spool in said first shell segment so as to be rotatable therein;

B. fastening a first end of said photographic filmstrip to said spool located in said first shell segment;

C. rotating said spool in said first shell segment to wind said photographic filmstrip onto said spool; and D. joining said second shell segment to said first shell segment after said rotating step C.

2. A method as recited in claim 1, wherein an entire length of said photographic filmstrip is contained in said cassette shell in an unused state, and said cassette shell comprises means for guiding a second end of said photographic filmstrip to an outside of said cassette shell through a film passage mouth in response to rotation of said spool in a direction to unwind said photographic filmstrip.

3. A method as recited in claim 2, wherein said spool is constituted of a spool core and a pair of flanges disposed on opposite end portions of said spool core, and said method further comprises the step of assembling said spool core and said flanges into said spool.

4. A method as recited in claim 3, wherein said locating step A comprises the steps of:

holding said first shell segment stationary in a position wherein an inside of said first shell segment is oriented upward, and said rotational axis is oriented horizontal; and putting said spool coaxially on said first shell segment.

5. A method as recited in claim 4, wherein said fastening step B comprises the steps of:

rotating said spool to set a fastening member formed in said spool core in a predetermined angular position in said first shell segment;

guiding said first end of said photographic filmstrip to said fastening member of said spool set in said predetermined angular position; and engaging said first end of said photographic filmstrip with said fastening member of said spool.

6. An apparatus for assembling a photographic film cassette having a cassette shell, a spool mounted in said cassette shell to be rotatable about an axis, and a photographic filmstrip coiled about said spool, said cassette shell comprising at least first and second shell segments sectioned through said rotational axis of said spool, said assembling apparatus comprising:

a locating device for locating said spool in a predetermined orientation in said first shell segment so as to be rotatable therein;

a connecting device for connecting a first end of said photographic filmstrip to said spool located in said first shell segment;

a rotating device for rotating said spool in said first shell segment to wind said photographic filmstrip on to said spool; and a joining device disposed proximate to said rotating device for joining said second shell segment to said first shell segment after said rotation by said rotating device.

7. An apparatus as recited in claim 6, wherein said connecting device comprises:

a pair of insert rollers to uniformly nip said photographic filmstrip and guide it toward said spool located in said first shell segment without distorting said photographic filmstrip; and a fastening member of said spool, wherein said leading end of said photographic filmstrip is brought into engagement with said fastening member.

8. An apparatus as recited in claim 6, wherein said rotating device comprises:

a drive shaft; and a positioning shaft;

wherein said drive shaft and said positioning shaft are operative to rotate said spool in said first shell segment to wind said photographic filmstrip on to said spool.

* * * * *